(12) United States Patent
Hao et al.

(10) Patent No.: US 11,734,453 B2
(45) Date of Patent: Aug. 22, 2023

(54) PRIVACY-PRESERVING MOTION ANALYSIS

(71) Applicant: INTERNATIONAL BUSINESS MACHINES CORPORATION, Armonk, NY (US)

(72) Inventors: Tian Hao, White Plains, NY (US); Umar Asif, Melbourne (AU); Stefan Harrer, Hampton (AU); Jianbin Tang, Doncaster East (AU); Stefan von Cavallar, Sandringham (AU); Deval Samirbhai Mehta, Melbourne (AU); Jeffrey L. Rogers, Briarcliff Manor, NY (US); Erhan Bilal, Westport, CT (US); Stefan Renard Maetschke, Ascot Vale (AU)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 17/249,132

(22) Filed: Feb. 22, 2021

(65) Prior Publication Data
US 2022/0269824 A1 Aug. 25, 2022

(51) Int. Cl.
*G06F 21/62* (2013.01)
*G06V 40/20* (2022.01)
*G06F 18/24* (2023.01)

(52) U.S. Cl.
CPC .......... *G06F 21/6263* (2013.01); *G06F 18/24* (2023.01); *G06V 40/20* (2022.01)

(58) Field of Classification Search
CPC .. G06F 21/6245; G06F 21/6263; G06F 18/24; G06V 40/20
See application file for complete search history.

(56) References Cited

U.S. PATENT DOCUMENTS

| 9,619,891 | B2 * | 4/2017 | Bose | A63F 13/65 |
| 9,799,096 | B1 * | 10/2017 | De la Torre | A63F 13/655 |
| 2014/0299775 | A1 * | 10/2014 | Kimmel | G01P 13/00 |
| | | | | 250/341.8 |

(Continued)

FOREIGN PATENT DOCUMENTS

EP          3528460 A1 *   8/2019   ......... G06F 16/2455

OTHER PUBLICATIONS

J. Dai et al., "Towards privacy-preserving recognition of human activities," 2015 IEEE International Conference on Image Processing (ICIP), Quebec City, QC, 2015, pp. 4238-4242.

(Continued)

*Primary Examiner* — Shanto Abedin
(74) *Attorney, Agent, or Firm* — Kristofer L. Haggerty

(57) ABSTRACT

A method, a structure, and a computer system for privacy-preserving motion analysis. Embodiments may include collecting data corresponding to a user with one or more sensors and identifying one or more joints of the user based on the data. Embodiments may additionally include generating one or more 3D representations of the one or more joints of the user and anonymizing the one or more 3D representations by applying thereto a joint-centering and a random shuffling. Embodiments may further include classifying one or more actions of the user based on analysing the one or more 3D representations, and exporting at least one of the data and the one or more actions.

20 Claims, 10 Drawing Sheets

(56) References Cited

U.S. PATENT DOCUMENTS

| | | | | |
|---|---|---|---|---|
| 2015/0213702 | A1* | 7/2015 | Kimmel | G06V 20/52 382/103 |
| 2020/0211154 | A1* | 7/2020 | Ng | A61B 5/1128 |
| 2020/0349245 | A1* | 11/2020 | Shila | G07C 9/257 |
| 2021/0209734 | A1* | 7/2021 | Simhadri | G16H 30/40 |
| 2021/0232810 | A1* | 7/2021 | Parsa | G06N 3/08 |
| 2021/0365670 | A1* | 11/2021 | Shuster | G06F 18/00 |

OTHER PUBLICATIONS

Z. Wu et al., "Towards privacy-preserving visual recognition via adversarial training: a pilot study." In Proceedings of the European Conference on Computer Vision (ECCV), 2018, pp. 606-624.

B. Zhu et al., "Deepfakes for Medical Video De-Identification: Privacy Protection and Diagnostic Information Preservation." In Proceedings of the AAAI/ACM Conf. on AI, Ethics, and Society (AIES '20). ACM, pp. 414-420.

Chou et al., "Privacy-Preserving Action Recognition for Smart Hospitals using Low-Resolution Depth Images", arXiv:1811.09950v1, [cs.CV], Nov. 25, 2018, pp. 1-6.

Dai et al., "Towards Privacy-Preserving Activity Recognition Using Extremely Low Temporal and Spatial Resolution Cameras", https://www.cv-foundation.org/openaccess/content_cvpr_workshops_2015/W08/papers/Dai_Towards_Privacy-Preserving_Activity_2015_CVPR_paper.pdf, Computer Vision Foundation, 2015, pp. 1-9.

Mell et al., "The NIST Definition of Cloud Computing", National Institute of Standards and Technology, Special Publication 800-145, Sep. 2011, pp. 1-7.

U. Asif et al., "DeepActsNet: Spatial and Motion features from Face, Hands, and Body Combined with Convolutional and Graph Networks for Improved Action Recognition." [Submitted on Sep. 21, 2020], https://arxiv.org/abs/2009.09818, pp. 1-9.

U. Asif et al., "Privacy Preserving Human Fall Detection using Video Data," 2020. Proceedings of Machine Learning Research 116: pp. 39-51.

Z. Wang et al., "Privacy-Preserving Action Recognition Using Coded Aperture Videos," 2019 IEEE/CVF Conference on Computer Vision and Pattern Recognition Workshops (CVPRW), Long Beach, CA, 2019, pp. 1-10.

* cited by examiner

PRIVACY-PRESERVING MOTION ANALYSIS

BACKGROUND

The exemplary embodiments relate generally to motion analysis, and more particularly to privacy-preserving video-based motion analysis.

Patient data for healthcare treatment may be privacy sensitive. For example, raw video data of epilepsy patients recorded in epilepsy monitoring units cannot leave a hospital premises or be viewed by external people. In order to make external analytical use of such data, the video data must be transformed into a new data representation that preserves human privacy while still capturing useful motion information, for example to detect seizures and recognize their types.

SUMMARY

The exemplary embodiments disclose a method, a structure, and a computer system for privacy-preserving motion analysis. Embodiments may include collecting data corresponding to a user with one or more sensors and identifying one or more joints of the user based on the data. Embodiments may additionally include generating one or more 3D representations of the one or more joints of the user and anonymizing the one or more 3D representations by applying thereto a joint-centering and a random shuffling. Embodiments may further include classifying one or more actions of the user based on analysing the one or more 3D representations, wherein the classifying outputs a predicted action score, and determining whether an identity of the user can be reveres engineered from the one or more 3D representations, wherein the determining outputs a predicted privacy-preservation score. Lastly, embodiments may include, and based on determining that the identity of the user cannot be reverse engineered from the one or more 3D representations, exporting at least one of the data and the one or more actions.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
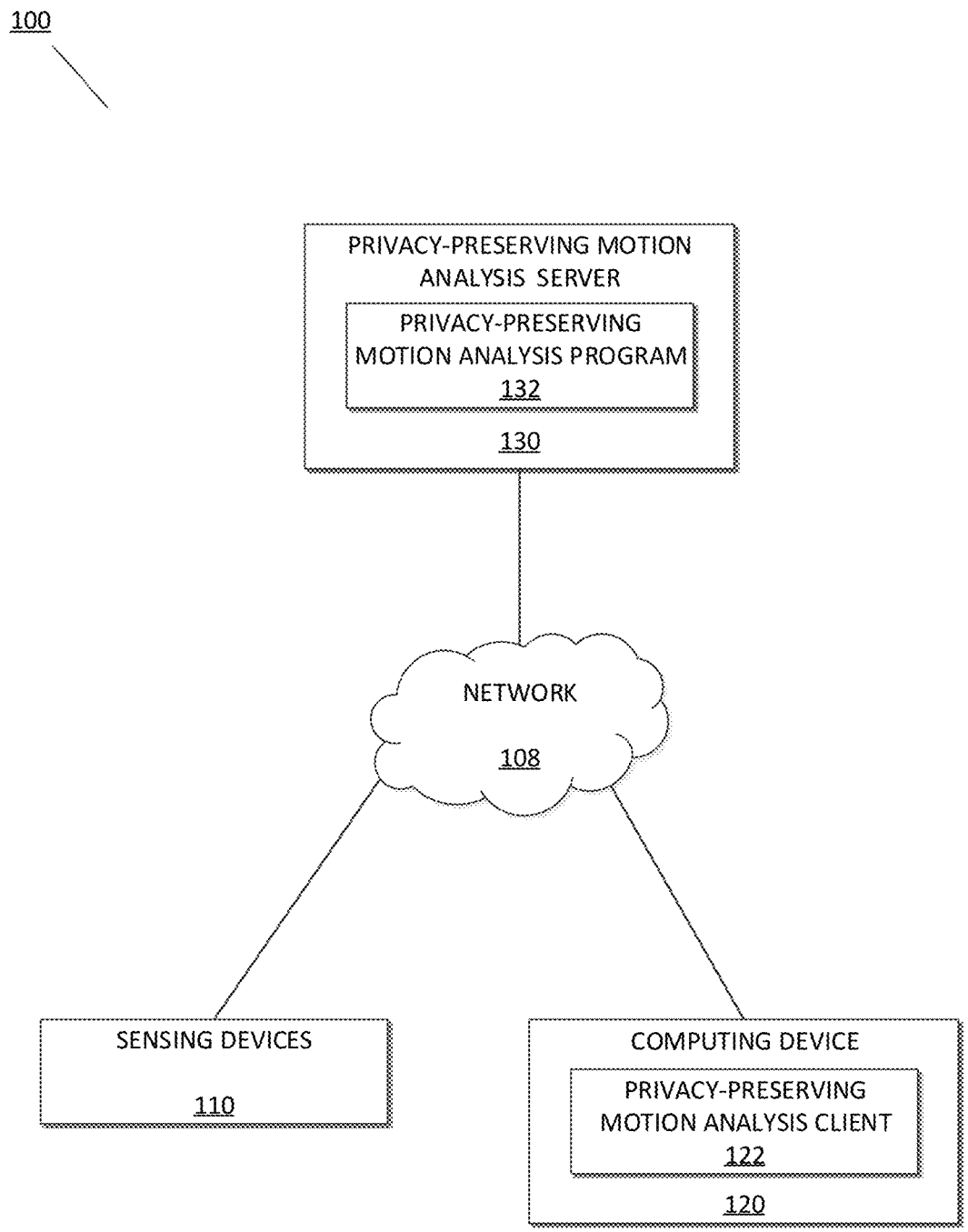
FIG. 1 depicts an exemplary schematic diagram of a privacy-preserving motion analysis system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Patient data for healthcare treatment may be privacy sensitive. For example, raw video data of epilepsy patients recorded in epilepsy monitoring units cannot leave a hospital premises or be viewed by external people. In order to make external analytical use of such data, the video data must be transformed into a new data representation that preserves human privacy while still capturing useful motion information, for example to detect seizures and recognize their types.

The claimed invention presents a novel system which may be tuned to maximize action detection or maximize privacy preservation. In the case of epilepsy, for instance, the system disclosed herein may be used to maximize seizure recognition accuracy, maximize the degree of data de-identification for maximum privacy preservation, or balance the two. The claimed invention further presents a means to de-identify users in videos by transforming the videos into abstract-level visual representations for use in, for instance, irreversible, privacy-preserving, online monitoring of epilepsy patients in epilepsy monitoring units.

The claimed invention achieves the above by coupling irreversible deep action stamps with AI modelling to produce motion action recognition performance as well as privacy preservation performance. The higher the privacy preservation performance, the higher the level of data de-identification and vice versa.

As described, the claimed invention also includes the generation of de-identified representations of videos by transforming the videos into abstract-level visual representations. Termed deep action stamps, they encode human body joints information and optical flow motion information extracted from the videos. The deep action stamps are made irreversible (i.e. the data cannot be re-engineered to reconstruct the original joints data or visual content of the video) through special joint-centering and random shuffling steps, as will be described in greater detail.

As a use case, the claimed invention will be described with reference to an illustrative example in which the claimed invention is deployed in epilepsy monitoring units where higher seizure detection performance is more important than preserving patient privacy. Here, the deep action stamps can be tuned to maximize motion/action preservation. For exporting data, the deep action stamps can be tuned to maximize data de-identification using special AI models. The effectiveness of the de-identification may be quantified in a privacy evaluation score that relates to the capability of the deep action stamp to preserve the identity of the patients. A higher the privacy preservation score, a higher the capability of the deep action stamps to de-identify the videos. In this manner, the data can be used for export purposes. Conversely, a predicted action score quantifies an effectiveness of the identified actions, and a higher the predicted action score a higher an accuracy at which the invention predicts user actions.

FIG. 1 depicts the privacy-preserving motion analysis system 100, in accordance with exemplary embodiments. According to the exemplary embodiments, the privacy-preserving motion analysis system 100 may include one or more sensing devices 110, a computing device 120, and a privacy-preserving motion analysis server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 GHz and 5 GHz internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the sensing devices 110 may be one or more devices capable of collecting data, for example video data, audio data, activity/movement data, biometric data, time-series data, etc. Accordingly, the sensing devices 110 may comprise mono/color cameras, infrared cameras, depth-sensing cameras/sensors, microphones, accelerometers, gyroscopes, etc., capable of collecting color images, thermal images, object depth, sound, velocity, acceleration, etc. The sensing devices 110 may be configured to be positioned within an environment (e.g., mounted within a room or on/within furniture), worn by a user (e.g., on the arms, hands, feet, legs, head, etc.), implantable, etc. Data from wearables (e.g., a smart watch) may be integrated into the motion analysis based on extracting a human motion profile (for example velocity, acceleration, etc.) from data received as a time-series using one or more artificial intelligence models. The sensing devices 110 may be further connected to one or more computing devices, for example the computing device 120 and the privacy-preserving motion analysis server 130, via the network 108.

In exemplary embodiments, the computing device 120 may include the privacy-preserving motion analysis client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the computing device 120 is shown as a single device, in other embodiments, the computing device 120 may be comprised of a cluster or plurality of computing devices, in a modular manner, etc., working together or working independently. The computing device 120 is described in greater detail as a hardware implementation with reference to FIG. 4, as part of a cloud implementation with reference to FIG. 5, and/or as utilizing functional abstraction layers for processing with reference to FIG. 6.

In exemplary embodiments, the privacy-preserving motion analysis client 122 may act as a client in a client-server relationship with a server, for example privacy-preserving motion analysis server 130, and may be a software and/or hardware application capable of communicating with and providing a user interface for a user to interact with a server and other computing devices via the network 108. Moreover, in the example embodiment, the privacy-preserving motion analysis client 122 may be capable of transferring data between the computing device 120 and other devices via the network 108. In embodiments, the privacy-preserving motion analysis client 122 may utilize various wired and wireless connection protocols for data transmission and exchange, including Bluetooth, 2.4 GHz and 5 GHz internet, near-field communication, Z-Wave, Zigbee, etc. The privacy-preserving motion analysis client 122 is described in greater detail with respect to FIG. 2-6.

In exemplary embodiments, the privacy-preserving motion analysis server 130 includes a privacy-preserving motion analysis program 132, and may act as a server in a client-server relationship with a client, e.g., the privacy-preserving motion analysis client 122. The privacy-preserving motion analysis server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the privacy-preserving motion analysis server 130 is shown as a single device, in other embodiments, the privacy-preserving motion analysis server 130 may be comprised of a cluster or plurality of computing devices, in a modular manner, etc., working together or working independently. The privacy-preserving motion analysis server 130 is described in greater detail as a hardware implementation with reference to FIG. 4, as part of a cloud implementation with reference to FIG. 5, and/or as utilizing functional abstraction layers for processing with reference to FIG. 6.

In embodiments, the privacy-preserving motion analysis program 132 may be a software and/or hardware program that may receive a configuration. The privacy-preserving motion analysis program 132 may additionally collect raw data and extract user joint data from the raw data. The privacy-preserving motion analysis program 132 may generate one or more deep action stamps based on the extracted jointed data and classify one or more motion actions based thereon. The privacy-preserving motion analysis program 132 may determine whether an action is severe and, if so, take rehabilitative action. Lastly, the privacy-preserving motion analysis program 132 may determine whether a user is identifiable based on the deep action stamps and, if determined in the negative, export the privacy-preserved and anonymized user data. The privacy-preserving motion analysis program 132 is described in greater detail with reference to FIG. 2-6.

Figure 2:
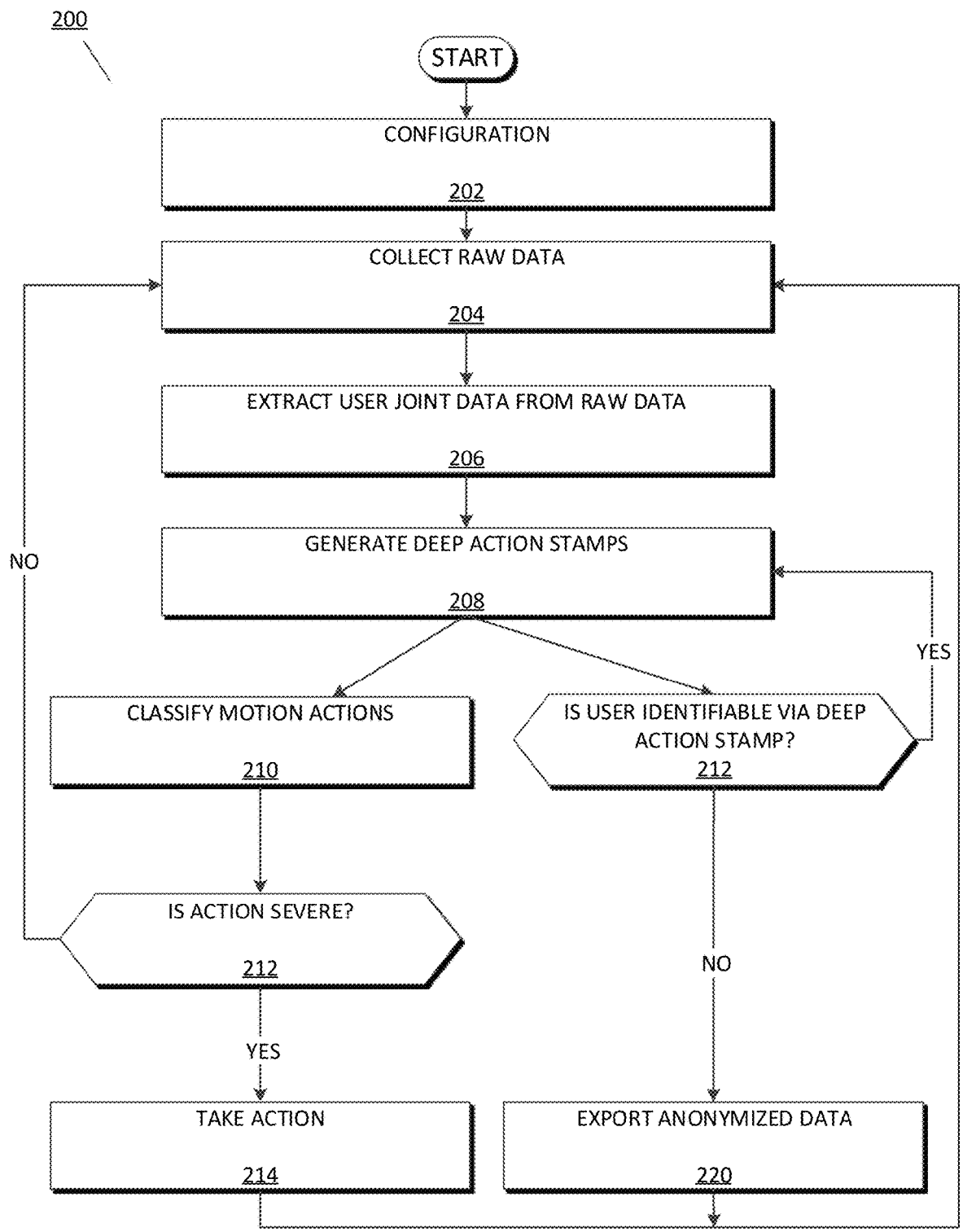
FIG. 2 depicts an exemplary flowchart 200 illustrating the operations of a privacy-preserving motion analysis program 132 of the privacy-preserving motion analysis system 100, in accordance with the exemplary embodiments.

FIG. 2 depicts an exemplary flowchart 200 illustrating the operations of the privacy-preserving motion analysis program 132 of the privacy-preserving motion analysis system 100, in accordance with the exemplary embodiments.

The privacy-preserving motion analysis program 132 may receive a configuration (step 202). In embodiments, the configuration may be input by an administrator or user of the privacy-preserving motion analysis system 100 via the privacy-preserving motion analysis client 122 and the network 108, and may include receiving information relating to the sensing devices 110, an environment, and a user. The configuration of the sensing devices 110 may involve identification and pairing thereof, for example via MAC address and the network 108, as well as positioning. The configuration of the sensing devices 110 may further include sensor-specific settings, such as calibration, placement of wearables, mounting of cameras, acoustics of microphones, etc. As previously described, the sensing devices 110 may include mounted, wearable, and implantable devices, and may comprise cameras, microphones, gyroscopes, accelerometers, and other devices capable of collecting data.

The configuration of the user information may include receiving user demographic information, such as name, age, gender, etc., as well as healthcare information, for example via linkage of an Electronic Health/Medical Record (EHR/EMR), user/administrator input, the sensing devices 110, etc. As described herein, the privacy-preserving motion analysis program 132 may store and utilize the user configuration information only in accordance with all applicable data privacy regulations and, to that point may, for example, limit use of person-identifying information to on premise use. In embodiments, person-identifying information may be used to merely track users and, for example, be anonymized, replaced with unique identifiers, encrypted, limited to specific use, limited to use in a specific location, limited in duration of use, etc. Moreover, a user may opt out of use of any such information at a granular level and have a general level of control over how their information is used.

In order to better illustrate the operations of the privacy-preserving motion analysis program 132, reference is now made to an illustrative example wherein the privacy-preserving motion analysis program 132 is used to analyse the motion of epilepsy patients in an epilepsy monitoring unit. An administrator uploads to the privacy-preserving motion analysis program 132 the EMRs of one or more patients, and maps one or more cameras within the epilepsy monitoring unit to each of the patients.

The privacy-preserving motion analysis program 132 may collect raw data (step 204). In embodiments, the privacy-preserving motion analysis program 132 may collect raw data via reference to the sensing devices 110 via network 108. As described above, the sensing devices 110 may be one or more devices capable of collecting data, for example video data, audio data, activity/movement data, biometric data, etc. Accordingly, the sensing devices 110 may comprise mono/color cameras, infrared cameras, depth-sensing cameras/sensors, microphones, accelerometers, gyroscopes, etc., capable of collecting color images, thermal images, object depth, sound, velocity, acceleration, etc. The sensing devices 110 may be configured to be positioned within an environment (e.g., mounted within a room or on/within furniture), worn by a user (e.g., on the arms, hands, feet, legs, head, etc.), implantable, etc. Data from wearables (e.g., a smart watch) may be integrated into the motion analysis based on extracting a human motion profile (for example velocity, acceleration, etc.) from data received as a time-series using one or more artificial intelligence models. The sensing devices 110 may be further connected to one or more computing devices, for example the computing device 120 and the privacy-preserving motion analysis server 130, via the network 108. Once collected, the raw data may be securely transmitted to the privacy-preserving motion analysis program 132 via the network 108, and may be done so in accordance with data privacy and transmission regulations.

Returning to the illustrative example introduced above, the privacy-preserving motion analysis program 132 collects video footage of the one or more patients within the epilepsy monitoring unit.

The privacy-preserving motion analysis program 132 may extract user joint data from the raw data (step 206). In embodiments, the privacy-preserving motion analysis program 132 may extract user joint data based on human-centric landmark key-points representing joints of the human body and optical flow information. With respect to extracting user joint data from mono/color image data, the privacy-preserving motion analysis program 132 may extract such key features using pose identification techniques that identify specific objects in the video footage (or image frames thereof) and determine each object's position and orientation relative to a coordinate system. Based on the relative positions and orientations of the objects identified in the image data, the privacy-preserving motion analysis program 132 may apply one or more models to discern limbs and joints of the user within the mapped objects. The privacy-preserving motion analysis program 132 may similarly extract user joint data from infrared image and depth sensor data, however may first apply one or more models to the data in order to first outline and discern objects within the images. In some embodiments, the privacy-preserving motion analysis program 132 may further extract user joint data from wearable and implantable devices. In such embodiments, the privacy-preserving motion analysis program 132 may apply artificial intelligence models to a time-series of data received from the wearables to determine a human motion profile, for example velocity, acceleration, etc., and reconstruct a mapping of the joints and body parts by applying one or more models thereto.

Joints extracted by the privacy-preserving motion analysis program 132 may include the neck, shoulders, elbows, hands, wrists, fingers, pelvis, knees, ankles, feet, toes, etc. In addition to joints, the landmark key-points may further include facial landmarks and other body parts. In one embodiment, the privacy-preserving motion analysis program 132 may extract 68 joints information from facial landmark locations, 21 joints location from each of the arms, leg, torso, head and spine, and 42 joints information from the finger joints of the two hands (see FIG. 3A-3C), and can also be extended to extract joint locations from the feet of a person. Moreover, the user joint data may illustrate all body parts and joints of a user over a time-series such that changes therein can be modified and analysed over time.

Figure 3A:
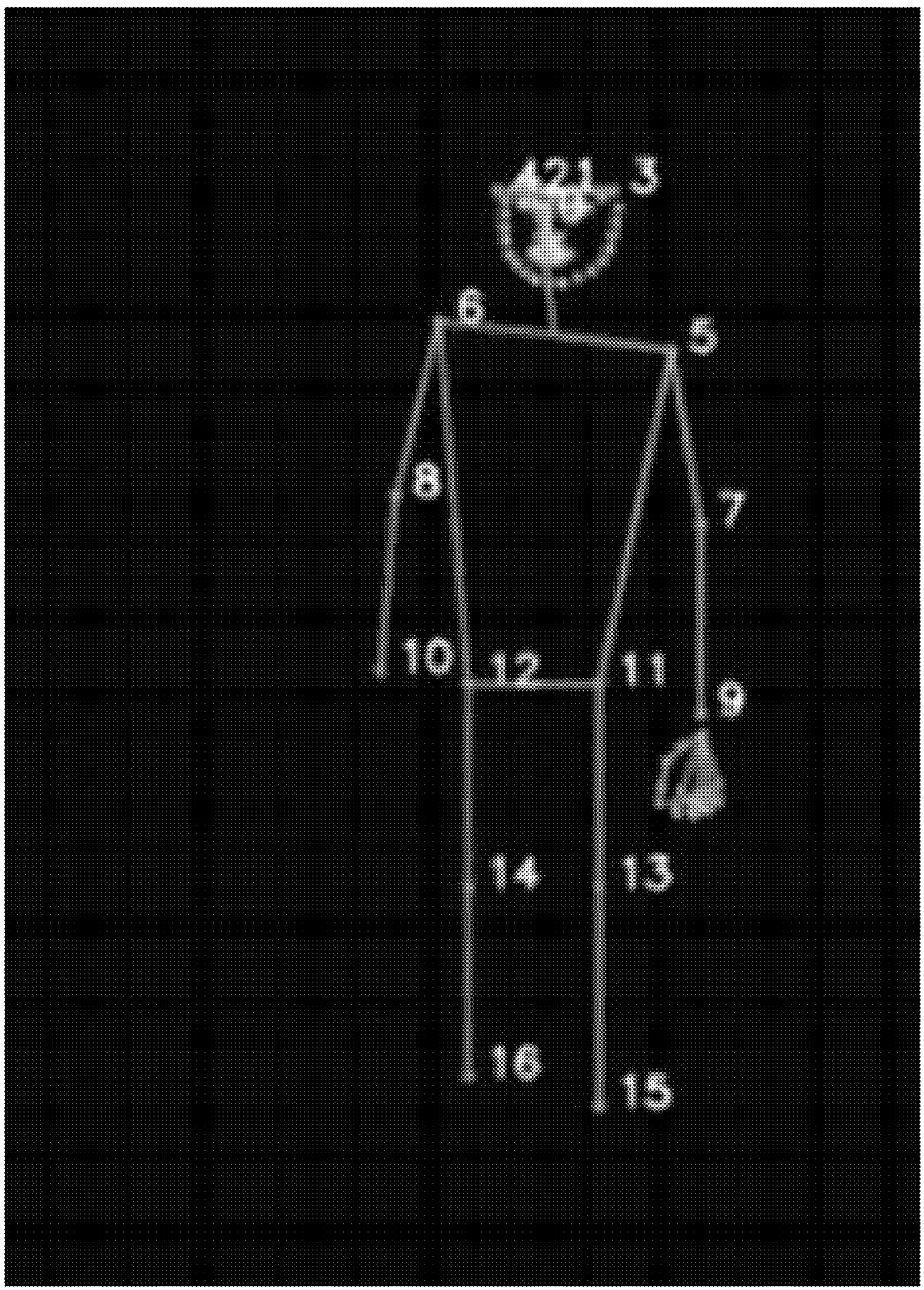
FIG. 3A-E depicts an example illustrating the operations of the privacy-preserving motion analysis program 132 of the privacy-preserving motion analysis system 100, in accordance with the exemplary embodiments.
Figure 3B:
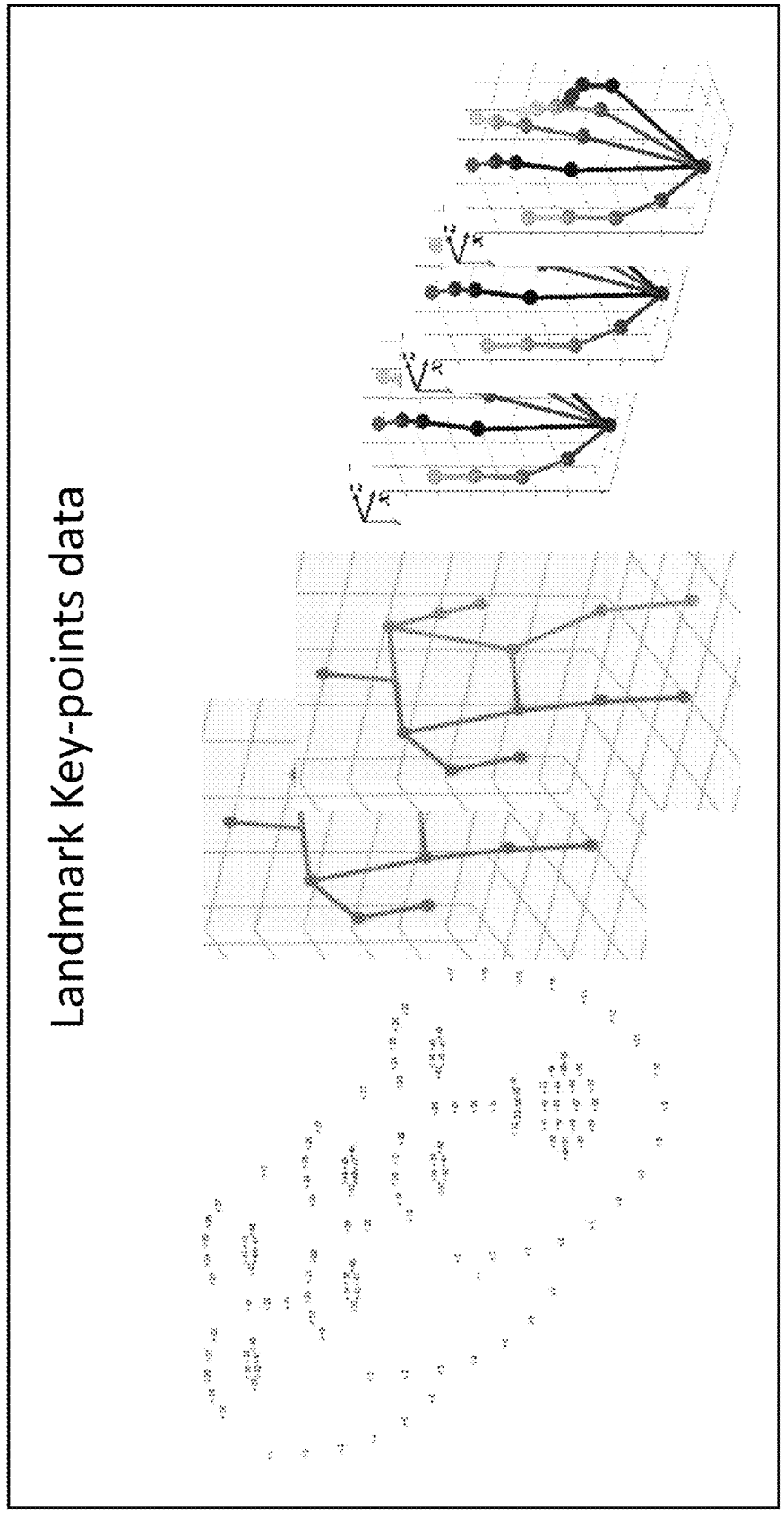
Figure 3C:
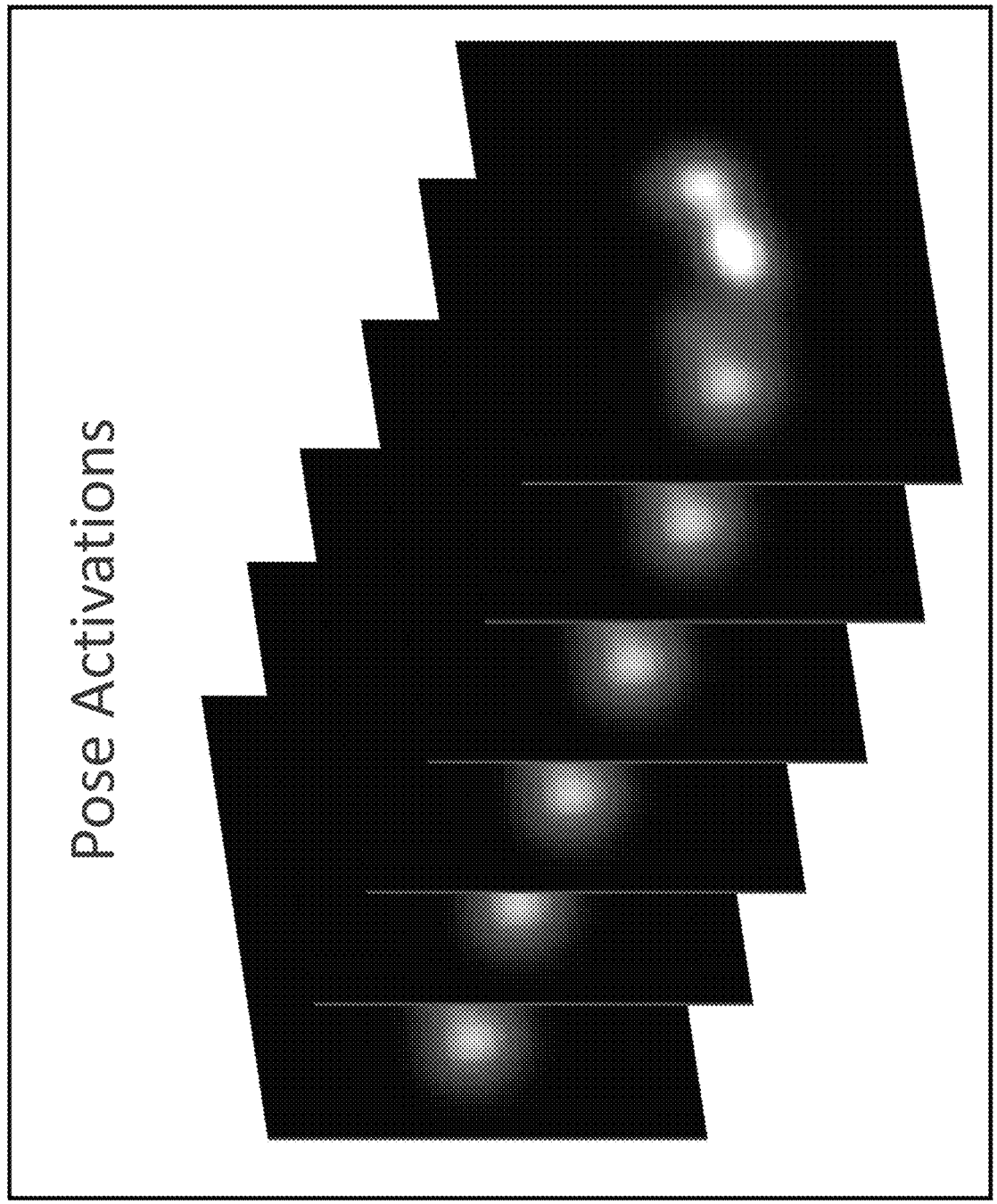

Furthering the previously introduced example, and with additional reference to FIG. 3A-3C, the privacy-preserving motion analysis program 132 extracts a pose of a user based on identifying one or more landmark key-points.

Figure 3D:
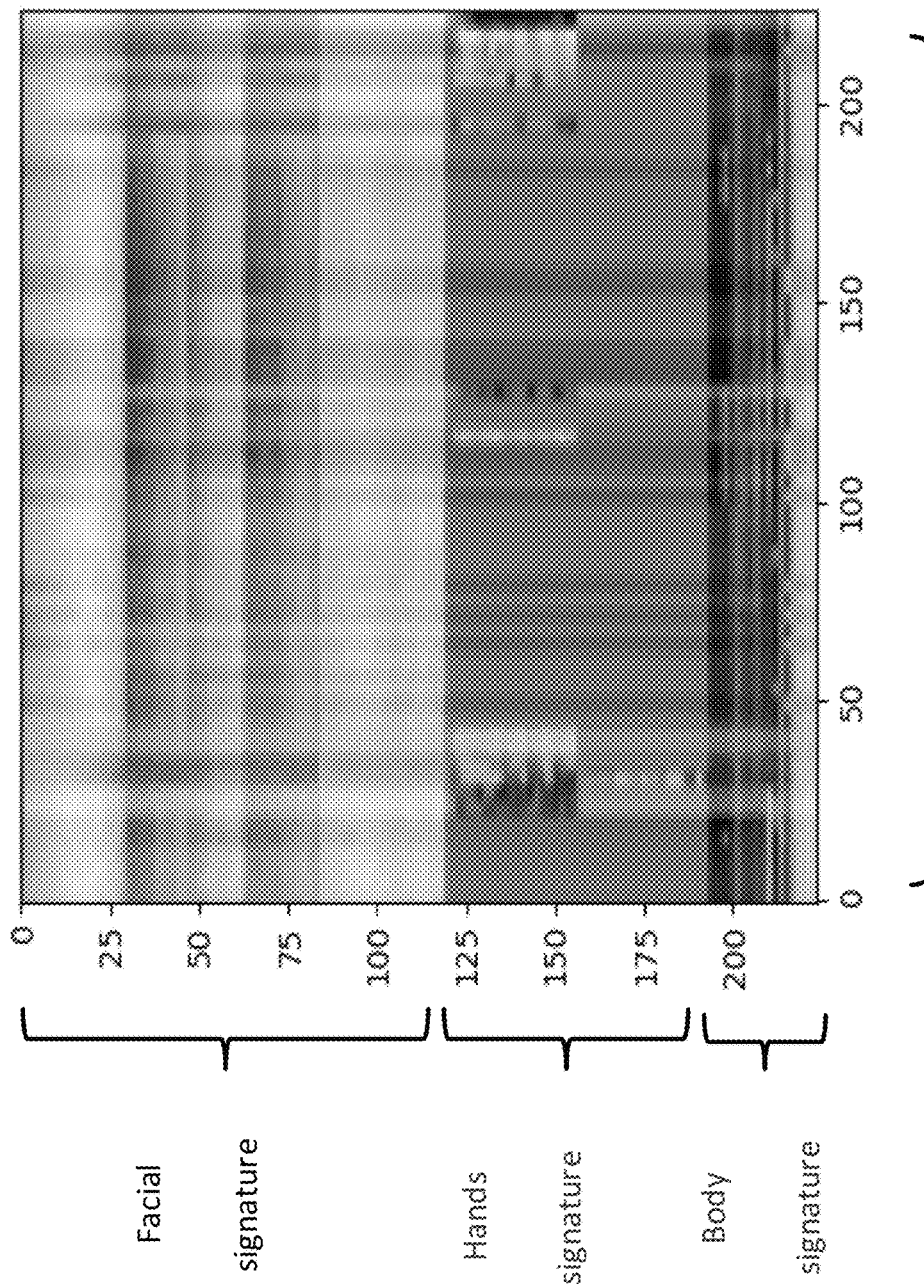

The privacy-preserving motion analysis program 132 may generate one or more deep action stamps based on the landmark key-points (step 208). In embodiments, the privacy-preserving motion analysis program 132 may generate the deep action stamps based on converting the user joint data into barcode-like visual representations having three channels. To construct the deep action stamps, the privacy-preserving motion analysis program 132 first estimates all joints information frame by frame for the entire video. The privacy-preserving motion analysis program 132 then encodes the joints data into an image representation such that the vertical axis of the image represents joints types and each of the horizontal axis represents time and users. As illustrated by FIG. 3D, a horizontal axis of each channel represents the data along a time scale (e.g., a column within a deep action stamp for each second of a video clip) while the vertical axis of the channel represents different joints types (e.g., a row for each type of joint). Here, individual users for which data is collected are represented by a horizontal axis extending into/out of the page, and the three channels of deep action stamps represent the x, y, and z coordinate locations of the joints in 3D cartesian space.

Figure 3E:
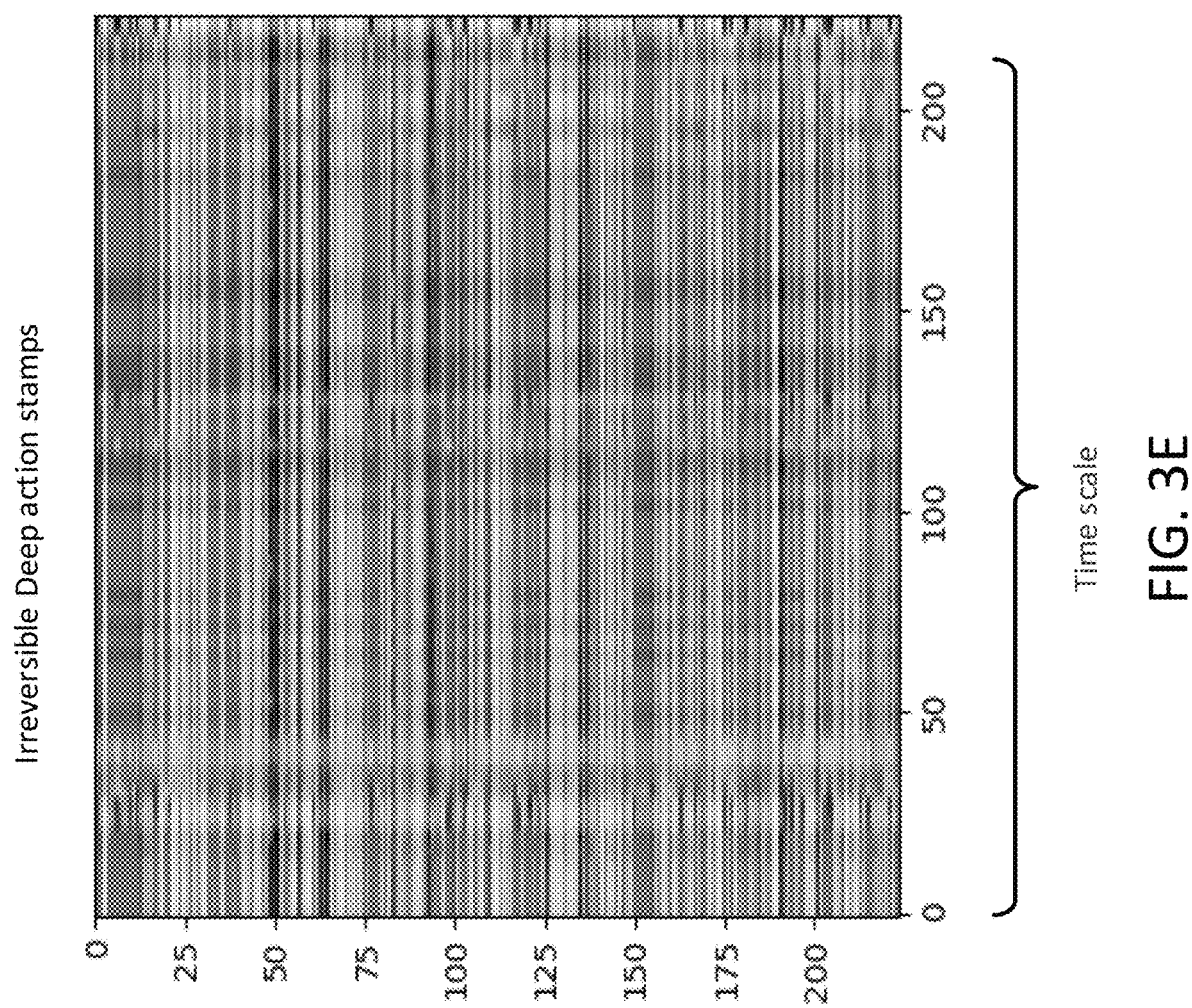

The privacy-preserving motion analysis program 132 may further perform joint-centering of the contents of the deep action stamps in order to disconnect a spatial connectivity between the joints while preserving a temporal connectivity between such joints (see FIG. 3E). Joint-centering, as used herein, a process in which each joint value (such as location) is normalized with respect to its reference joint, for example, facial joints, hand joints, and body joints compared to reference joints for face, hands, and body. During joint-centering, all joints are normalized with respect to their corresponding reference joints. This process results in the deep action stamps being invariant to spatial changes in the scene (e.g., joint data of the person appearing at the top right corner of the image would be similar to the joint data of the person appearing at the bottom right corner). The privacy-preserving motion analysis program 132 may further perform a random shuffling of the contents of the deep action stamps in order to introduce anonymity in the data by shuffling spatial locations. More specifically, random shuffling is a technique applied to the deep action stamps to anonymize the location of joints in the image. In the original deep action stamps, the joints data is encoded according to a specific layout along the vertical axis (e.g., rows 1-68 correspond to facial joints, rows 69-100 correspond to body joint, etc). In random shuffling, the locations of the joints types along the vertical axis are randomly shuffled, thereby anonymizing the position of joint types in the deep action stamps. This is done to provide an additional layer of privacy preservation because after random shuffling step, it is unknown which rows correspond to which joint types. Via the joint-centering and random shuffling of the contents of the deep action stamps, the privacy-preserving motion analysis program 132 ensures that the deep action stamps are irreversible. In doing so, the privacy-preserving motion analysis program 132 prevents one in possession of the deep action stamps of reconstructing the original key-points or visual content of the raw video.

With reference again to the previously introduced example and FIG. 3, the privacy-preserving motion analysis program 132 converts the raw video data of the epilepsy patients in the epilepsy monitoring unit into corresponding deep action stamps using joint-centering and random shuffling techniques.

The privacy-preserving motion analysis program 132 may classify one or more motion actions of a user based on the deep action stamps (step 210). In embodiments, the privacy-preserving motion analysis program 132 may classify motion actions based on analyses such as general activity/action recognition, human fall detection, seizure detection, gait analysis, etc. General activity/action recognition may include differentiation between different activities of daily life such as eating, waving a hand, sleeping, talking, writing, reading, playing, etc. In addition, human fall detection may determine whether a user has fallen, while seizure detection recognize, analyse, and identify types of seizures. Gait analysis may analyse the movement patterns of a person getting up from or sitting down in a chair for, e.g., people suffering with Parkinson's disease. In generally, the privacy-preserving motion analysis program 132 may be configured to identify any recognizable type of motion while nonetheless balancing and preserving an identify of a user.

Moreover, in some embodiments, the privacy-preserving motion analysis program 132 may be capable of predicting actions. For human fall detection, for instance, the system can monitor the direction and motion of a user for indications of potential fall situations based on detecting and identifying anomalies in the user joint data using one or more models. In addition, the privacy-preserving motion analysis program 132 may further utilize these identified potential, predicted actions to provide haptic feedback to the user through wearable devices, or to emergency support staff in case a fall occurs. For example, the privacy-preserving motion analysis program 132 may be configured to alert a user or administrator of a predicted event through a notification, vibration, etc. of the computing device 120 or the sensing devices 110.

Referring again to the previously introduced example, the privacy-preserving motion analysis program 132 monitors the deep action stamps for indications of motion actions by analysing facial deformations, hand movements, and motion of the limbs.

The privacy-preserving motion analysis program 132 may determine whether a detected motion action is severe (decision 212). In embodiments, the privacy-preserving motion analysis program 132 may determine whether a motion action is severe based on determining that a confidence score corresponding to the classified motion action exceeds a threshold. In embodiments, the thresholds can be varied based on the type of motion action and severity thereof.

With reference again to the previously introduced example, the privacy-preserving motion analysis program 132 determines that a seizure is severe based on comparing a confidence score corresponding to the seizure with a corresponding threshold set by an administrator of the epilepsy monitoring unit.

If the privacy-preserving motion analysis program 132 determines that a motion action is severe (decision 212, "YES" branch), then the privacy-preserving motion analysis program 132 take rehabilitative action (step 214). For example, the privacy-preserving motion analysis program 132 may raise an alarm locally/remotely as well as both digitally/physically, for example over loud speakers, via push notification, phone, etc. The privacy-preserving motion analysis program 132 may include within the raised alarm a description of the motion activity, a severity thereof, a frequency thereof, user information (demographic/healthcare related), etc. In embodiments, the privacy-preserving motion analysis program 132 may be configured to take action by applying a treatment or prophylaxis of a medical condition or disease. For example, the privacy-preserving motion analysis program 132 may be configured to administer or modify a dosage of a particular medication or treatment. The privacy-preserving motion analysis program 132 my take further action with respect to devices, for example modify flowrates or pressures with respect to ventilators, medication drips, and other fluidic devices. The privacy-preserving motion analysis program 132 may further modify local temperature, bed angle, or any other action configured by an administrator or user.

In the example introduced above, the privacy-preserving motion analysis program 132 raises an alarm alerting an administrator of the epilepsy monitoring unit via phone indicating that a patient is exhibiting signs of a seizure.

If the privacy-preserving motion analysis program 132 determines that the motion action is not severe (decision 212, "NO" branch), the privacy-preserving motion analysis program 132 may continue to collect raw data.

The privacy-preserving motion analysis program 132 may determine whether an identity of a user may be determined based on the deep action stamps (decision 216). In embodiments, the privacy-preserving motion analysis program 132 may attempt to identify the user in order to ensure that the identities and privacies of the user(s) are maintained by the deep action stamps, and may do so by attempting to recognize an identity of the subject based on the joint-centered and random shuffled deep action stamps. Based on the attempt, the privacy-preserving motion analysis program 312 may calculate a privacy-preserving score/output indicative of a preservation of the privacy of the user. The privacy-reserving motion analysis program 132 may then compare this score to threshold in order to determine whether the privacy has indeed been maintained. Notably, the motion action recognition described above and the privacy preservation are related to each other in that an increase in privacy preservation results in a decrease in action recognition and vice versa. Therefore, the privacy-preserving motion analysis program 132 may intelligently balance action recognition and privacy preservation in order to be tuned to achieve either high action recognition accuracy or high data privacy protection performance, whichever is required depending upon the user/client requirements. Moreover, by training the action recognition and privacy preservation techniques in combination, the privacy-preserving motion analysis system 100 can be tuned to find the optimal balance between action recognition performance and privacy preservation performance.

With respect to the example introduced above, the privacy-preserving motion analysis program 132 determines whether the identity of a user is capable of being re-engineered from the joint-centered and randomly shuffled deep action stamps.

Based on determining that an identity of the user can be determined based on the deep action stamps (decision 216, "YES" branch), the privacy-preserving motion analysis program 132 may regenerate the deep action stamps (step 208). In regenerating the deep action stamps, the privacy-preserving motion analysis program 132 may be configured to increase privacy-preservation, and in turn increase the privacy-preservation score.

Based on determining that an identity of the user cannot be determined based on the deep action stamps (decision 216, "NO" branch), the privacy-preserving motion analysis program 132 may export the de-identified and anonymized data (step 218). In embodiments, the privacy-preserving motion analysis program 132 may export the anonymized data to institutions such as hospitals, research facilities, schools, healthcare agencies, insurance companies, etc., and do so in a manner such that the data cannot be reverse engineered to obtain the identify of any particular user/data owner. In embodiments, the data is anonymized by virtue of the joint-centering and random shuffling of the contents of the deep action stamps, along with the additional, aforementioned privacy evaluation, however in other embodiments, additional privacy-preserving actions may be taken. Owners of the data, e.g., the user, may be capable of opting in and out of such exportations, and may granularly opt out of the exportation of any particular piece of data or exportation to any particular entity.

In furthering the previously introduced example, the privacy-preserving motion analysis program 132 exports the privacy-preserved and anonymized data to an epilepsy doctor of the user.

FIG. 3A-E depicts an example illustrating the operations of the privacy-preserving motion analysis program 132 of the privacy-preserving motion analysis system 100, in accordance with the exemplary embodiments.

Figure 4:
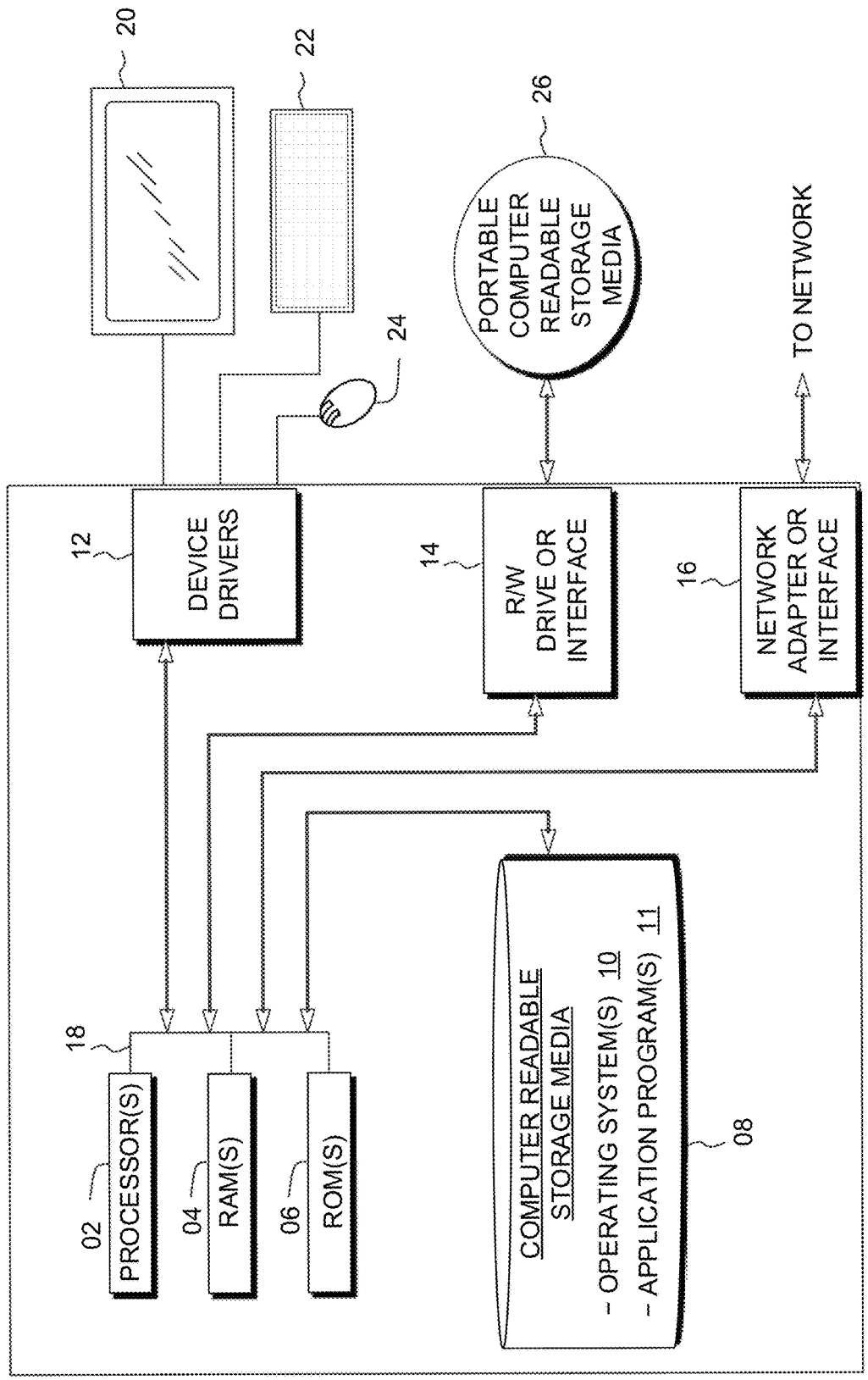
FIG. 4 depicts an exemplary block diagram depicting the hardware components of the privacy-preserving motion analysis system 100 of FIG. 1, in accordance with the exemplary embodiments.

FIG. 4 depicts a block diagram of devices used within the privacy-preserving motion analysis system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective RAY drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
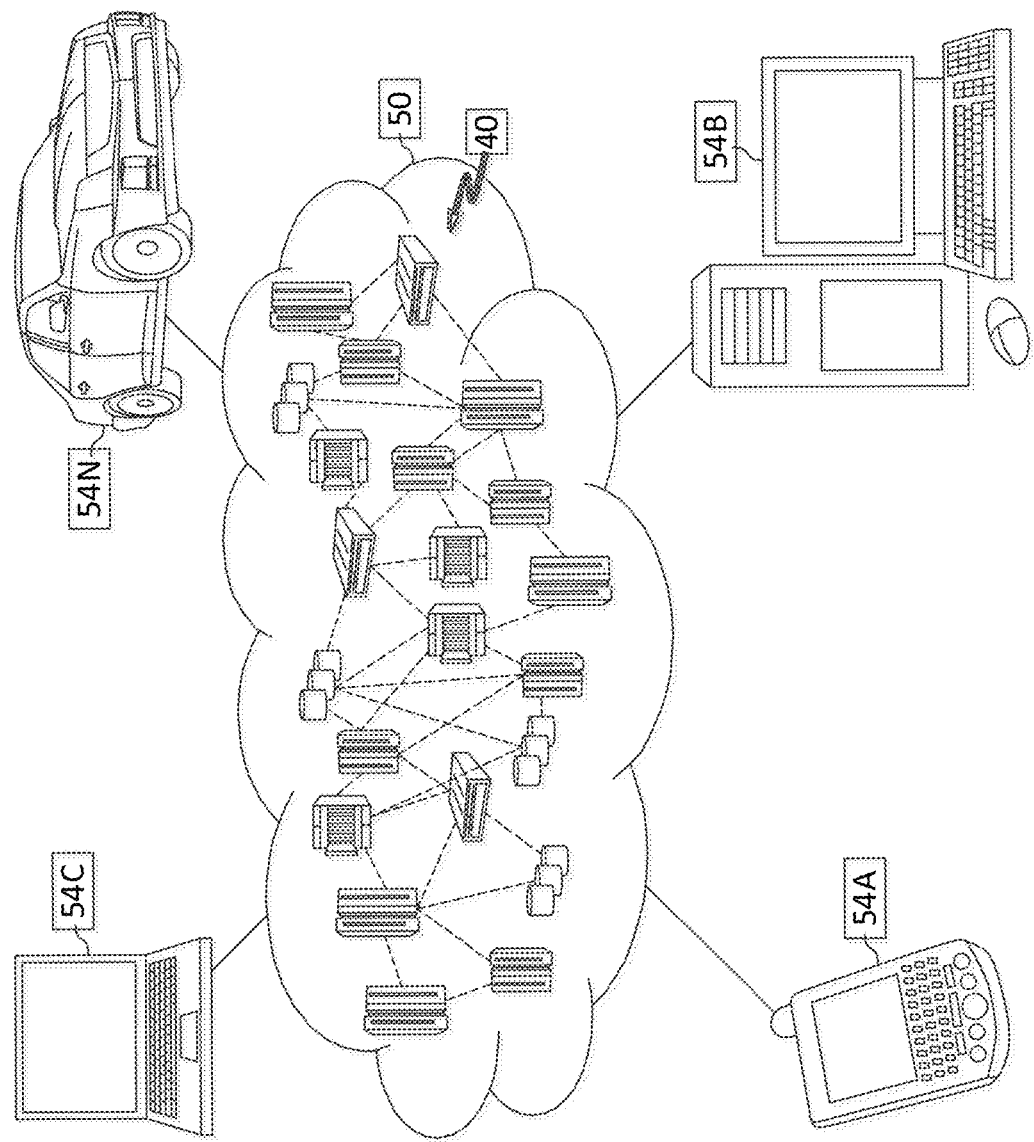
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
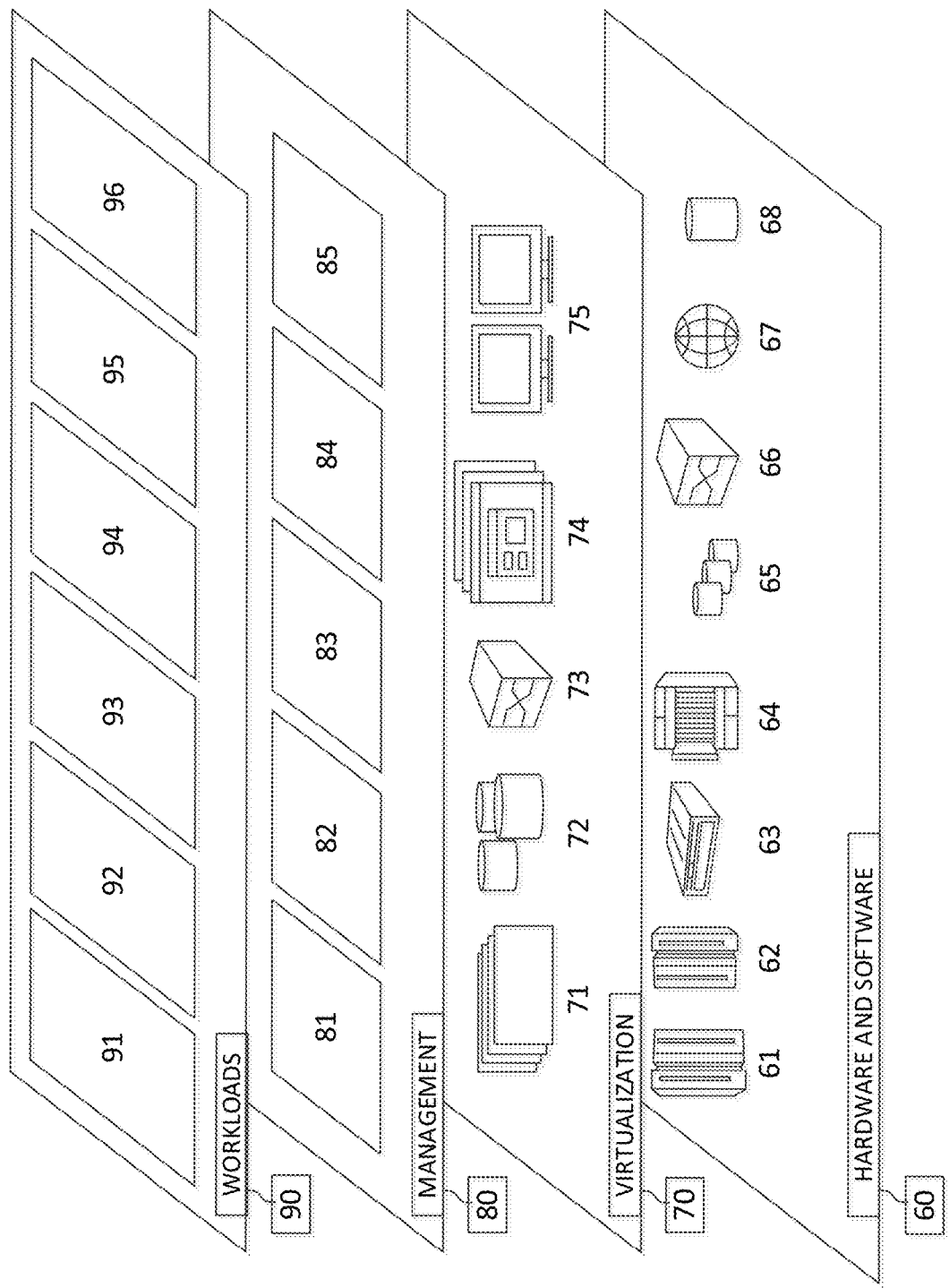
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and privacy-preserving motion analysis processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for privacy-preserving motion analysis, the method comprising:
   collecting data corresponding to a user with one or more sensors;
   identifying one or more joints of the user based on the data;
   generating one or more 3D representations of the one or more joints of the user;
   anonymizing the one or more 3D representations by applying thereto a joint-centering and a random shuffling;
   classifying one or more actions of the user based on analysing the one or more 3D representations, wherein the classifying outputs a predicted action score;
   determining whether an identity of the user can be reverse engineered from the one or more 3D representations, wherein the determining outputs a predicted privacy-preservation score; and
   based on determining that the identity of the user cannot be reverse engineered from the one or more 3D representations, exporting at least one of the data and the one or more actions.

2. The method of claim 1, wherein the predicted action score is increased by decreasing the predicted privacy-preservation score, and wherein the predicted privacy-preservation score may be increased by decreasing the predicted action score.

3. The method of claim 1, wherein the joint-centering disconnects a spatial connectivity but preserves a temporal connectivity between the one or more joints within the one or more 3D representations.

4. The method of claim 1, wherein the random shuffling shuffles spatial locations of the one or more joints within the one or more 3D representations.

5. The method of claim 1, wherein classifying the one or more actions of the user is based on applying a model to the data, and wherein the one or more actions are predicted in the future.

6. The method of claim 1, wherein the random shuffling is irreversible.

7. The method of claim 1, wherein the one or more actions are selected from a group comprising general motion, posture, gait, a fall, a seizure, and anomalies.

8. A computer program product for privacy-preserving motion analysis, the computer program product comprising:
   one or more computer-readable storage media and program instructions stored on the one or more computer-readable storage media, the program instructions including a method, the method comprising:
   collecting data corresponding to a user with one or more sensors;

identifying one or more joints of the user based on the data;

generating one or more 3D representations of the one or more joints of the user;

anonymizing the one or more 3D representations by applying thereto a joint-centering and a random shuffling;

classifying one or more actions of the user based on analysing the one or more 3D representations, wherein the classifying outputs a predicted action score;

determining whether an identity of the user can be reverse engineered from the one or more 3D representations, wherein the determining outputs a predicted privacy-preservation score; and based on determining that the identity of the user cannot be reverse engineered from the one or more 3D representations, exporting at least one of the data and the one or more actions.

9. The computer program product of claim 8, wherein the predicted action score is increased by decreasing the predicted privacy-preservation score, and wherein the predicted privacy-preservation score may be increased by decreasing the predicted action score.

10. The computer program product of claim 8, wherein the joint-centering disconnects a spatial connectivity but preserves a temporal connectivity between the one or more joints within the one or more 3D representations.

11. The computer program product of claim 8, wherein the random shuffling shuffles spatial locations of the one or more joints within the one or more 3D representations.

12. The computer program product of claim 8, wherein classifying the one or more actions of the user is based on applying a model to the data, and wherein the one or more actions are predicted in the future.

13. The computer program product of claim 8, wherein the random shuffling is irreversible.

14. The computer program product of claim 8, wherein the one or more actions are selected from a group comprising general motion, posture, gait, a fall, a seizure, and anomalies.

15. A computer system for privacy-preserving motion analysis, the computer system comprising:

one or more computer processors, one or more computer-readable storage media, and program instructions stored on one or more of the computer-readable storage media for execution by at least one of the one or more processors, the program instructions including a method, the method comprising:

collecting data corresponding to a user with one or more sensors;

identifying one or more joints of the user based on the data;

generating one or more 3D representations of the one or more joints of the user;

anonymizing the one or more 3D representations by applying thereto a joint-centering and a random shuffling;

classifying one or more actions of the user based on analysing the one or more 3D representations, wherein the classifying outputs a predicted action score;

determining whether an identity of the user can be reverse engineered from the one or more 3D representations, wherein the determining outputs a predicted privacy-preservation score; and based on determining that the identity of the user cannot be reverse engineered from the one or more 3D representations, exporting at least one of the data and the one or more actions.

16. The computer system of claim 15, wherein the predicted action score is increased by decreasing the predicted privacy-preservation score, and wherein the predicted privacy-preservation score may be increased by decreasing the predicted action score.

17. The computer system of claim 15, wherein the joint-centering disconnects a spatial connectivity but preserves a temporal connectivity between the one or more joints within the one or more 3D representations.

18. The computer system of claim 15, wherein the random shuffling shuffles spatial locations of the one or more joints within the one or more 3D representations.

19. The computer system of claim 15, wherein classifying the one or more actions of the user is based on applying a model to the data, and wherein the one or more actions are predicted in the future.

20. The computer system of claim 15, wherein the random shuffling is irreversible.

* * * * *